US012586544B2

(12) United States Patent  
Uratani et al.

(10) Patent No.: US 12,586,544 B2  
(45) Date of Patent: Mar. 24, 2026

(54) ELECTRONIC PAPER AND CONTROL METHOD OF ELECTRONIC PAPER

(71) Applicant: SHARP KABUSHIKI KAISHA, Sakai (JP)

(72) Inventors: Osamu Uratani, Sakai (JP); Yukio Yokoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 23 days.

(21) Appl. No.: 18/620,863

(22) Filed: Mar. 28, 2024

(65) Prior Publication Data

US 2024/0339087 A1 Oct. 10, 2024

(30) Foreign Application Priority Data

Apr. 5, 2023 (JP) ................................. 2023-061343

(51) Int. Cl.
| | |
|---|---|
| *G09G 3/34* | (2006.01) |
| *G02F 1/167* | (2019.01) |
| *G02F 1/1676* | (2019.01) |
| *G02F 1/1685* | (2019.01) |

(52) U.S. Cl.
CPC ........... *G09G 3/3446* (2013.01); *G02F 1/167* (2013.01); *G02F 1/1676* (2019.01); *G02F 1/1685* (2019.01); *G09G 2320/041* (2013.01)

(58) Field of Classification Search
CPC ......................... G09G 3/344; G09G 2320/041
See application file for complete search history.

(56) References Cited

U.S. PATENT DOCUMENTS

| | | | | |
|---|---|---|---|---|
| 7,616,375 | B2 | 11/2009 | Hirai et al. | |
| 2008/0174852 | A1 | 7/2008 | Hirai et al. | |
| 2009/0109145 | A1* | 4/2009 | Okada ..................... | G09G 3/344 |
| | | | | 345/76 |
| 2010/0194794 | A1* | 8/2010 | Nose ..................... | G09G 3/3614 |
| | | | | 345/691 |
| 2011/0074756 | A1* | 3/2011 | Markvoort ............. | G09G 3/344 |
| | | | | 345/204 |
| 2012/0212470 | A1* | 8/2012 | van Veenendaal ... | G09G 3/2081 |
| | | | | 345/211 |
| 2016/0351097 | A1* | 12/2016 | Sato ........................ | G09G 3/344 |
| 2021/0142740 | A1* | 5/2021 | Gao ........................ | G02F 1/1676 |
| 2021/0312873 | A1* | 10/2021 | Cheng ..................... | G02F 1/167 |
| 2023/0282176 | A1* | 9/2023 | Lin ........................ | G09G 3/344 |
| | | | | 345/208 |

FOREIGN PATENT DOCUMENTS

JP 2008-176196 A 7/2008

* cited by examiner

*Primary Examiner* — Bipin Gyawali  
(74) *Attorney, Agent, or Firm* — ScienBiziP, P.C.

(57) ABSTRACT

Electronic paper includes a display panel, a temperature sensor, and a controlling section. The display panel contains particles which move when a voltage is applied. The temperature sensor detects a temperature. The controlling section controls a rewriting operation to rewrite an image of the display panel by applying a rewriting voltage to the color particles. If a result of detection by the temperature sensor falls within a predetermined temperature range, the controlling section performs the rewriting operation after performing a preparatory operation to apply a preparatory voltage to the color particles.

10 Claims, 3 Drawing Sheets

ELECTRONIC PAPER AND CONTROL METHOD OF ELECTRONIC PAPER

INCORPORATION BY REFERENCE

The present application claims the benefit of priority under 35 U.S.C. Section 119 to Japanese Patent Application No. 2023-061343 filed on Apr. 5, 2023, which is incorporated herein by reference in its entirety.

BACKGROUND

The present disclosure relates to electronic paper and a control method of electronic paper.

Electronic paper has conventionally been known as a display device which can be repeatedly rewritten and consumes little electric power. Japanese Patent Application Publication No. 2008-176196 describes electronic paper including an electrophoretic layer having many microcapsules, and a pixel electrode and a common electrode disposed to oppose each other with the electrophoretic layer therebetween. The microcapsules have two types of black or white electrophoretic particles and a dispersion medium to disperse the electrophoretic particles. By applying a predetermined voltage between the pixel electrode and the common electrode, the two types of electrophoretic particles move within the microcapsules to rewrite the image.

SUMMARY

Electronic paper according to a first aspect of the present disclosure includes a display panel, a temperature sensor, and a controlling section. The display panel contains color particles which move when a voltage is applied. The temperature sensor detects a temperature. The controlling section controls a rewriting operation to rewrite an image of the display panel by applying a rewriting voltage to the color particle. If a result of detection by the temperature sensor falls within a predetermined temperature range, the controlling section performs the rewriting operation after performing a preparatory operation to apply a preparatory voltage to the color particles.

A control method of electronic paper according to a second aspect of the present disclosure is a control method of electronic paper, the electronic paper including a display panel containing color particles which move when a voltage is applied. The control method of the electronic paper includes: detecting a temperature; determining whether the detected temperature falls within a predetermined temperature range; performing a preparatory operation to apply a preparatory voltage to the color particles if the detected temperature falls within the predetermined temperature range; and rewriting an image of the display panel by applying a rewriting voltage to the color particles after performing the preparatory operation.

DETAILED DESCRIPTION

Figure 1:
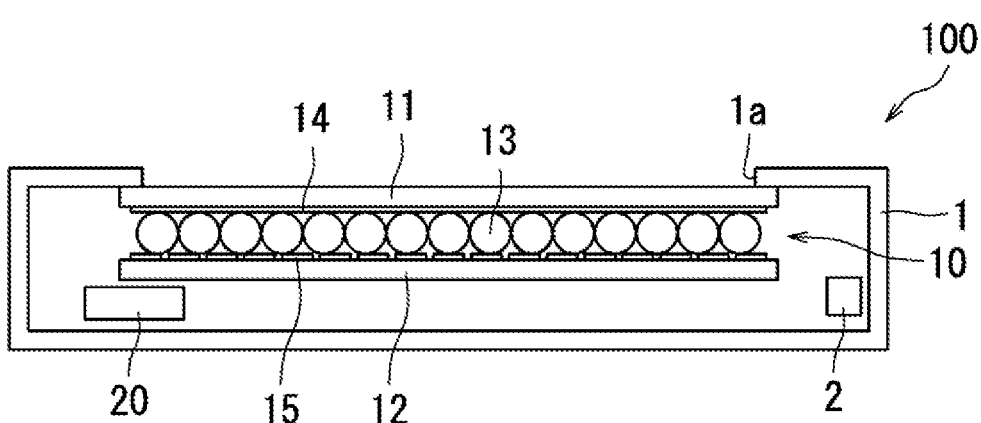
FIG. 1 is a sectional view schematically illustrating a structure of electronic paper according to an embodiment of the present disclosure.

Hereafter, the embodiment(s) of the present disclosure will be described with reference to the drawings. Note that the same or corresponding portions are assigned the same reference numeral in the drawings, and are not repeatedly explained.

The following describes electronic paper 100 according to an embodiment of the present disclosure, with reference to FIG. 1 to FIG. 4. FIG. 1 is a sectional view schematically illustrating a structure of electronic paper 100 according to an embodiment of the present disclosure.

As illustrated in FIG. 1, the electronic paper 100 functions as a display device to display an image. The electronic paper 100 is used as, for example, an electronic inventory tag, an electronic advertisement, an electronic book device, or an electronic notebook. Alternatively, that the electronic paper 100 may be used as a device other than the electronic inventory tag, the electronic advertisement, the electronic book device, or the electronic notebook.

The electronic paper 100 includes a housing 1 and a display panel 10. The housing 1 accommodates therein a display panel 10. The housing 1 has an opening 1a on the front surface thereof.

The display panel 10 displays an image. The display panel 10 is formed to be larger than the opening 1a of the housing 1, and is disposed to cover the opening 1a. An area of the display panel 10, which corresponds to the opening 1a, is a display area on which the image is viewed by a user.

The display panel 10 also includes a first substrate 11, a second substrate 12 disposed to oppose the first substrate 11, a plurality of microcapsules 13, a first electrode 14, and second electrodes 15.

The first substrate 11 is formed of a transparent plate member or a sheet member made of glass, resin, or the like. An exterior surface of the first substrate 11 (which faces away from the second substrate 12) may be provided with an anti-reflection film or may be water-repellent finished. The second substrate 12 is formed of a plate member or a sheet member made of glass, resin, or the like.

The microcapsules 13 are disposed between the first substrate 11 and the second substrate 12. For example, one layer of the microcapsules 13 is provided between the first substrate 11 and the second substrate 12. A microcapsule 13 has a substantially spherical shape. A microcapsule 13 has a diameter of some tens of μm or more and several hundreds of μm or less, for example.

Figure 2:
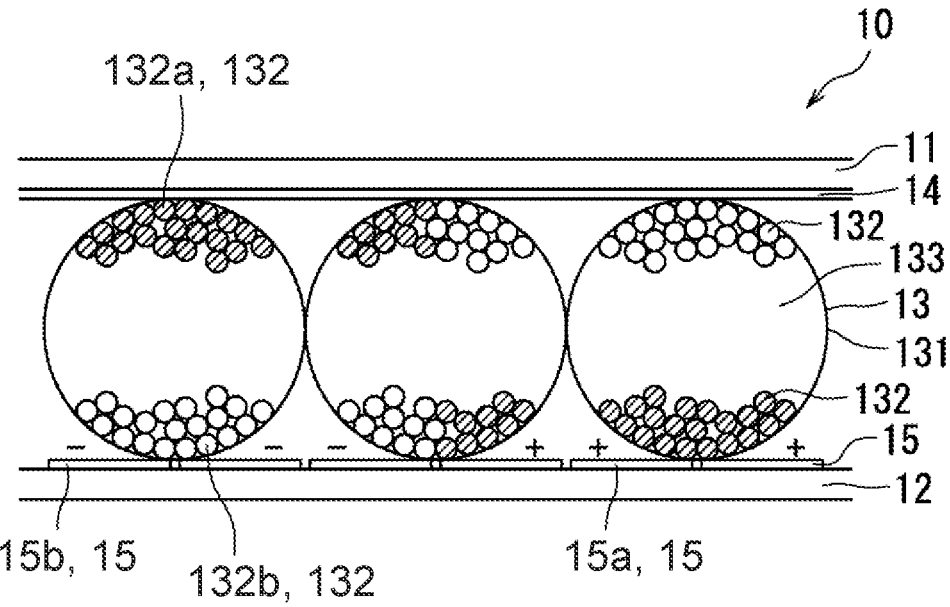
FIG. 2 is an enlarged view schematically illustrating a structure around microcapsules of the electronic paper.

FIG. 2 is an enlarged view schematically illustrating a structure around the microcapsules 13 of the electronic paper 100. As illustrated in FIG. 2, a microcapsule 13 includes a film 131, a plurality of color particles 132, and a dispersion liquid 133. The film 131 is transparent, in an example. The film 131 is made of a transparent resin, in an example. The material of the film 131 is not particularly limited, and may be urethane resin, melamine resin, or rubber, for example.

The color particles 132 are a pigment. The color particles 132 constitute a part of the image displayed on the display panel 10. The color particles 132 move when a voltage is applied. In the present embodiment, to move includes to rotate, and the like, in addition to positional movement. In the present embodiment, the color particles 132 are particles which perform electrophoresis. Specifically, the color particles 132 move within the dispersion liquid 133, according to a voltage applied between the first electrode 14 and the second electrodes 15. As a result, a predetermined image is displayed on the display panel 10.

The color particles 132 are organic or inorganic particles, for example. In the present embodiment, the color particles 132 include, for example, black particles 132*a*, as a black pigment, and white particles 132*b*, as a white pigment. The black particles 132*a*, as a black pigment, are not particularly limited, and may include carbon black or titanium black, for example. The white particles 132*b*, as a white pigment, are not particularly limited, and may include titanium dioxide or titanium trioxide, for example. Note that the black particles 132*a* and the white particles 132*b* are examples of "color particle" in the present disclosure.

The black particles 132*a* are negatively charged, in an example. On the other hand, the white particles 132*b* are positively charged, in an example. That is, the black particles 132*a* are different, in both in color and polarity, from the white particles 132*b*. Note that another example is possible in which the black particles 132*a* are positively charged and the white particles 132*b* are negatively charged.

In the present embodiment, the color particles 132 include black and white pigments, as described above. However, the color particles 132 may include any different-color pigment(s), in place of the black pigment and the white pigment. Alternatively, the color particles 132 may include any different-color pigment(s), in addition to the black pigment and the white pigment. Examples of the different-color pigment(s) include a yellow pigment, a red pigment, a blue pigment, a white pigment, and/or a green pigment.

The dispersion liquid 133 is transparent, in an example. The dispersion liquid 133 is an insulating liquid. The dispersion liquid 133 is not particularly limited, and may include water, alcoholic solvents, esters, ketones, aliphatic hydrocarbons, alicyclic hydrocarbons, aromatic hydrocarbons, or oils. In the present embodiment, the dispersion liquid 133 includes aliphatic hydrocarbons, for example.

The first electrode 14 and the second electrodes 15 are disposed to oppose each other with the microcapsules 13 therebetween.

The first electrode 14 is disposed on an outer side (closer to the first substrate 11) with respect to the microcapsules 13. The first electrode 14 may be formed on the first substrate 11 for example. In the present embodiment, the first electrode 14 is formed on the first substrate 11.

The first electrode 14 is formed of a translucent conductive material. The first electrode 14 is not particularly limited, and is formed by indium tin oxide (ITO), for example. In the present embodiment, the first electrode 14 is a common electrode. One first electrode 14 is provided for a plurality pixels (for all the pixels, in this example). The first electrode 14 is grounded and has a ground potential, in an example.

The second electrodes 15 are disposed on an inner side (closer to the second substrate 12) with respect to the microcapsules 13. The second electrodes 15 may be formed on the second substrate 12. In the present embodiment, the second electrodes 15 are formed on the second substrate 12.

The second electrodes 15 are not particularly limited, and are formed of a metal material such as copper. In the present embodiment, the second electrodes 15 are pixel electrodes. A second electrode 15 is formed in a substantially rectangular shape in a plan view, and a plurality of such second electrode 15 are provided. The plurality of second electrodes 15 are disposed adjacent to one another with a predetermined interval therebetween.

For example, when a positive potential is applied to the second electrodes 15*a*, the black particles 132*a* between the second electrodes 15*a* and the first electrode 14 are drawn to the second electrodes 15*a*. In addition, the white particles 132*b* between the second electrodes 15*a* and the first electrode 14 are drawn to the first electrode 14.

On the other hand, when a negative potential is applied to the second electrodes 15*b*, for example, the black particles 132*a* between the second electrodes 15*b* and the first electrode 14 are drawn to the first electrode 14. In addition, the white particles 132*b* between the second electrodes 15*b* and the first electrode 14 are drawn to the second electrodes 15*b*.

As illustrated in FIG. 1, the electronic paper 100 includes a temperature sensor 2 and a controller 20.

The temperature sensor 2 detects temperature. In an example, the temperature sensor 2 is disposed in the housing 1, in a position opposite to the controller 20. In other words, the temperature sensor 2 is disposed at a predetermined interval from the controller 20. Therefore, increase in detection temperature of the temperature sensor 2 attributed to the heat of the controller 20 can be restrained.

The temperature sensor 2 is provided to measure the ambient temperature of the electronic paper 100, for example. For example, a vent hole may be provided at a position of the housing 1, which opposes a temperature detection element of the temperature sensor 2. In addition, the temperature detection element of the temperature sensor 2 may be exposed outside the housing 1. The temperature detected by the temperature sensor 2 may be corrected to be the ambient temperature of the electronic paper 100.

The temperature sensor 2 is not particularly limited, and may be a thermocouple, a thermistor, or an infrared sensor. The temperature sensor 2 transmits a result of the detection (i.e., the detected temperature) to the controller 20.

The controller 20 controls various types of operations of the electronic paper 100. The controller 20 controls the display panel 10. As a result, the electronic paper 100 displays a predetermined image.

Figure 3:
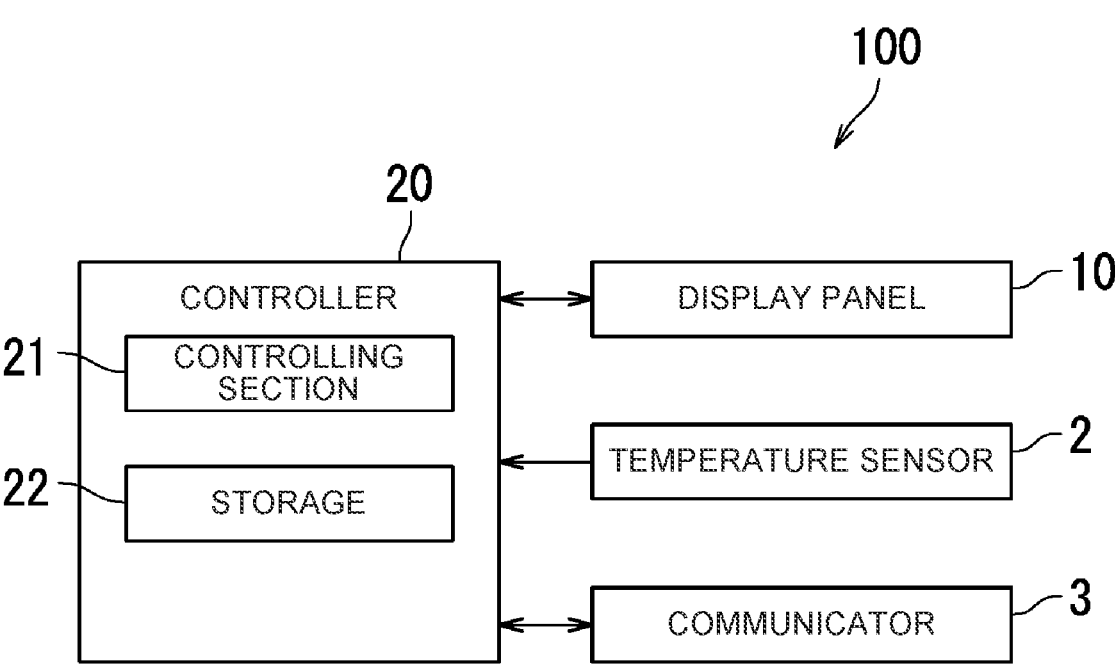
FIG. 3 is a block diagram illustrating a configuration of the electronic paper.

The following describes the configuration of the electronic paper 100 with reference to FIG. 3. FIG. 3 is a block diagram illustrating the configuration of the electronic paper 100.

As illustrated in FIG. 3, the electronic paper 100 includes a communicator 3, in addition to the above-described display panel 10, temperature sensor 2, and controller 20. The electronic paper 100 may further include an operation button for accepting an inputting operation of a user. In addition, the electronic paper 100 may include a touch panel for accepting an inputting operation of a user, on a surface of the display panel 10.

The communicator 3 is an interface device for wireless communication, in an example. The communicator 3 is a network interface controller, in an example. The communicator 3 communicates with a personal computer, or the like, via a communication network such as the Internet and a public telephone network, in an example. The communicator 3 is capable of receiving an instruction signal from an instructing terminal (not illustrated) such as a personal computer, in an example. Note that the communicator 3 may be capable of transmitting and receiving signals to and from the instructing terminal (not illustrated). The communicator 3 may be an interface device for wireless communication, in an example.

The controller 20 includes a controlling section 21 and a storage 22. The controlling section 21 includes a processor. For example, the controlling section 21 includes a central processing unit (CPU). Alternatively, the controlling section 21 may include a general computer.

The storage 22 stores data and computer programs. The data include image data related to a display image to be displayed on the display panel 10, for example.

The storage 22 includes a main storage and an auxiliary storage. The main storage is a semiconductor memory, for example. The auxiliary storage is a semiconductor memory and/or a hard disk drive, for example. The storage 22 may include a removable medium. The controlling section 21 executes a computer program stored in the storage 22, and performs a rewriting operation and a preparatory operation, which will be described later.

The following describes the controlling section 21 in greater detail.

The controlling section 21 is capable of performing a rewriting operation and a preparatory operation. The rewriting operation is an operation to rewrite the image on the display panel 10. The preparatory operation is an operation to apply, before the rewriting operation, a predetermined voltage to the display panel 10 under a predetermined environment for preparation of the rewriting operation. The predetermined environment includes a predetermined temperature environment. In the present embodiment, the predetermined environment includes a predetermined temperature environment which is based on a detection result of the temperature sensor 2.

The controlling section 21 performs a rewriting operation, based on image data. The controlling section 21 performs a rewriting operation within a rewritable temperature range. The controlling section 21 performs a rewriting operation by applying a rewriting voltage to the color particles 132. Specifically, the controlling section 21 performs a rewriting operation by applying a rewriting voltage between the first electrode 14 and the second electrodes 15. The rewritable temperature range is not particularly limited, and may be 5 degrees centigrade or higher and lower than 53 degrees centigrade.

The controlling section 21 performs a rewriting operation after performing a preparatory operation within a predetermined temperature range which is lower than the rewritable temperature range. The controlling section 21 performs a preparatory operation by applying a preparatory voltage to the color particles 132. Specifically, the controlling section 21 performs a preparatory operation by applying a preparatory voltage between the first electrode 14 and the second electrodes 15. The predetermined temperature range is not particularly limited, and may be lower than an ordinary temperature (25 degrees centigrade), for example. The predetermined temperature range is preferably lower than 20 degrees centigrade and more preferably lower than 10 degrees centigrade. In the present embodiment, the predetermined temperature range is −3 degrees centigrade or higher and lower than 5 degrees centigrade.

The controlling section 21 does not perform a rewriting operation at a temperature higher than the rewritable temperature range. The controlling section 21 does not perform a preparatory operation at a temperature higher than the rewritable temperature range, either.

The controlling section 21 does not perform a rewriting operation at a temperature lower than the predetermined temperature range. The controlling section 21 does not perform a preparatory operation at a temperature lower than the predetermined temperature range, either.

The rewriting voltage is a voltage corresponding to a display gradation of an image after rewriting. For example, in a dynamic range of 16 white and black gradations, when a display gradation of a pixel in the display image after rewriting is 5, a voltage corresponding to the display gradation 5 is applied to that pixel. In a rewriting operation, a voltage corresponding to the display gradation of each pixel in the display image after rewriting is applied to that pixel. Note that when a display gradation of a pixel in the display image after rewriting is 15 (white), for example, a positive maximum voltage (a voltage corresponding to the display gradation 15) is applied to that pixel. When a display gradation of a pixel in the display image after rewriting is 0 (black), a negative maximum voltage (a voltage corresponding to the display gradation 0) is applied to that pixel.

On the other hand, a preparatory voltage is a voltage that does not depend on a display gradation of the display image after rewriting. Specifically, a preparatory voltage of a same magnitude is applied to a pixel having a display gradation of 0 and to a pixel having a display gradation of 5, in the display image after rewriting, for example. When performing a preparatory operation, a voltage corresponding to a display gradation 0 and/or a voltage corresponding to a display gradation 15, in the dynamic range of 16 white and black gradations, are applied to all the pixels, for example.

Also in the present embodiment, during a preparatory operation, the controlling section 21 applies a second voltage after applying a first voltage, as a preparatory voltage. The second voltage is a voltage which is reverse in polarity to the first voltage. For example, when the first voltage is a negative voltage, the second voltage is a positive voltage.

In addition, the absolute value of the preparatory voltage (the first voltage, the second voltage) is equal to or greater than the absolute value of the maximum voltage of the rewriting voltage (a voltage corresponding to the display gradation 0 or the display gradation 15). Specifically, when a voltage corresponding to the display gradation 0 is assumed to be −5V, and a voltage corresponding to the display gradation 15 is assumed to be +5V, the absolute value of the preparatory voltage (the first voltage, the second voltage) is equal to or higher than 5V (the absolute value of +5V and −5V). Note that in the present embodiment, the absolute value of the preparatory voltage (the first voltage, the second voltage) is the same as the absolute value of the maximum voltage of the rewriting voltage (a voltage corresponding to the display gradation 0 or the display gradation 15). That is, the first voltage is either a voltage corresponding to the display gradation 0 (−5V) or a voltage corresponding to the display gradation 15 (+5V), for example. The second voltage is either a voltage corresponding to the display gradation 15 (+5V) or a voltage corresponding to the display gradation 0 (−5V), for example. Note that the absolute value of the preparatory voltage (the first voltage, the second voltage) may be greater than the absolute value of the maximum voltage of the rewriting voltage (a voltage corresponding to the display gradation 0 or the display gradation 15).

Figure 4:
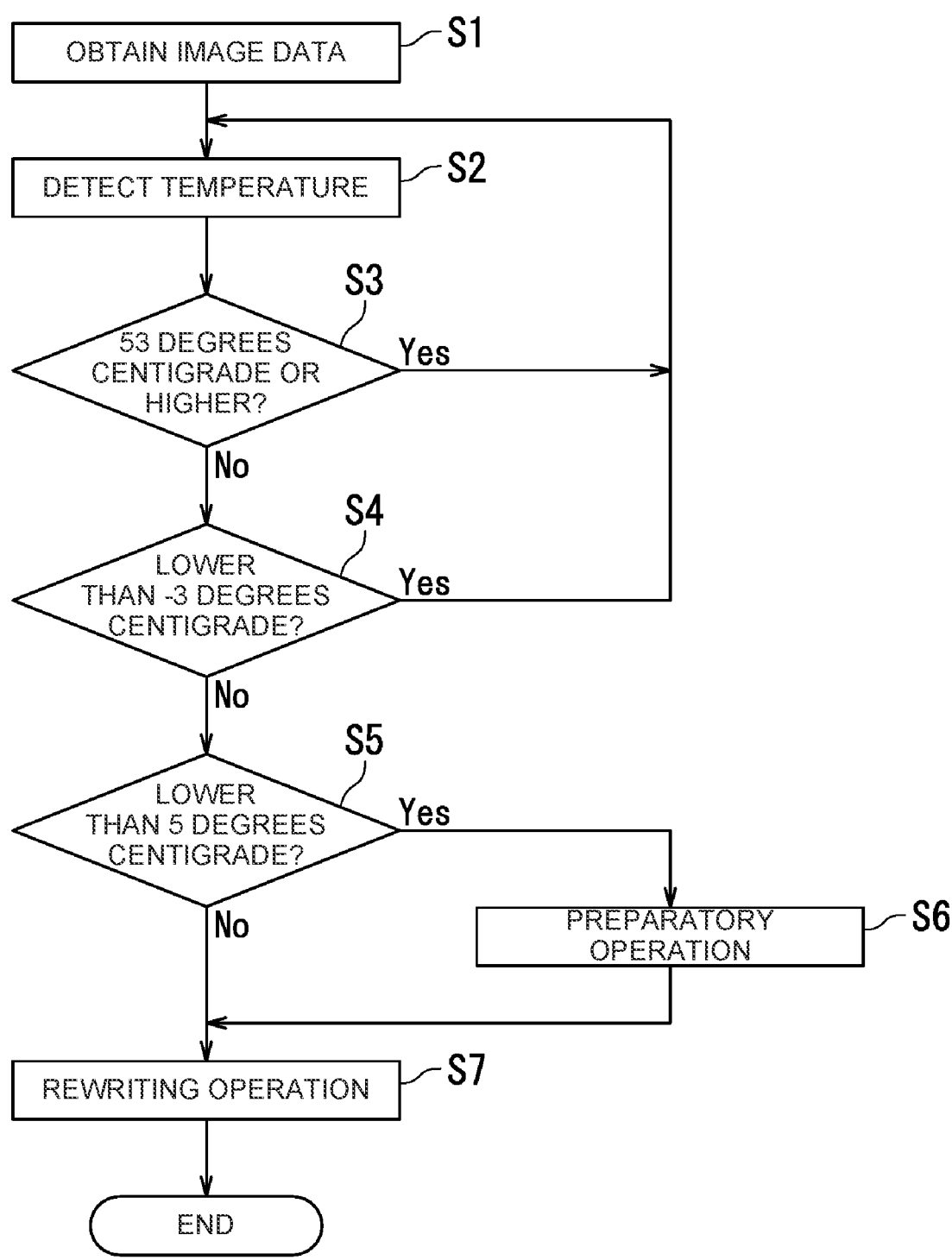
FIG. 4 is a flowchart for explaining a control method of electronic paper.

The following describes a control method of the electronic paper 100 according to the present embodiment with reference to FIG. 4. FIG. 4 is a flowchart for explaining the control method of the electronic paper 100. The control method of the electronic paper 100 includes step S1 to step S7. Note that step S2 is an example of "detecting a temperature" in the present disclosure. Step S4 and step S5 are examples of "determining whether (the detected temperature) falls within a predetermined temperature range" in the present disclosure. Step S6 is an example of "performing a preparatory operation" in the present disclosure. Step S7 is an example of "rewriting an image" in the present disclosure.

With reference to FIG. 4, the following describes a control method after the electronic paper 100 receives an instruction to rewrite an image from a user or an instructing terminal. Note that a user's rewriting instruction is performed by operation of the electronic paper 100 by the user, for example. A rewriting instruction by an instructing terminal is performed by transmission of a rewriting signal from the instructing terminal to the electronic paper 100 at a predetermined time, for example.

In the description of the control method of the electronic paper 100, the first voltage is assumed to be the voltage corresponding to the display gradation 0 (in this example, −5V) and the second voltage is assumed to be the voltage corresponding to the display gradation 15 (in this example, +5V), to facilitate the understanding.

As illustrated in FIG. 4, in step S1, the controlling section 21 obtains image data related to a display image after rewriting. Specifically, the controlling section 21 obtains the image data related to the display image after rewriting, from the storage 22. Note that the image data may be stored in the storage 22 in advance, or may be transmitted from the instructing terminal to the electronic paper 100.

Next, in step S2, the temperature sensor 2 detects a temperature. Specifically, the temperature sensor 2 detects the temperature, and transmits the detection result to the controlling section 21. The controlling section 21 obtains the detection result of the temperature sensor 2.

Next, in step S3, the controlling section 21 determines whether the temperature obtained in step S2 is equal to or higher than a third temperature (in this example, 53 degrees centigrade).

In step S3, if the controlling section 21 determines that the temperature is equal to or higher than 53 degrees centigrade, the control returns to step S2. That is, no rewriting operation is performed. Here, the controlling section 21 may issue an error notification. A method of the error notification is not particularly limited, and may be performed by flashing the LED included in the electronic paper 100 or by transmitting an error signal from the electronic paper 100 to the instructing terminal.

On the other hand, in step S3, if the controlling section 21 determines that the temperature is below 53 degrees centigrade, the control proceeds to step S4.

Next, in step S4, the controlling section 21 determines whether the temperature obtained in step S2 is below a second temperature (in this example, −3 degrees centigrade). Note that −3 degrees centigrade which is a determination criterion in step S4 is an example of the "second temperature" in the present disclosure.

In step S4, if the controlling section 21 determines that the temperature is below −3 degrees centigrade, the control returns to step S2. That is, no rewriting operation is performed. Here, the controlling section 21 may issue an error notification. A method of the error notification is not particularly limited, and may be the same as that performed in step S3.

On the other hand, in step S4, if the controlling section 21 determines that the temperature is equal to or higher than −3 degrees centigrade, the control proceeds to step S5.

Next, in step S5, the controlling section 21 determines whether the temperature obtained in step S2 is below a first temperature (in this example, 5 degrees centigrade). Note that 5 degrees centigrade which is a determination criterion in step S5 is an example of the "first temperature" in the present disclosure.

In step S5, if the controlling section 21 determines that the temperature is below 5 degrees centigrade, the control proceeds to step S6.

Next, in step S6, the controlling section 21 performs a preparatory operation. Specifically, the controlling section 21 applies a preparatory voltage between the first electrode 14 and the second electrodes 15, for a predetermined time. During this operation, in the present embodiment, the controlling section 21 applies the first voltage, as the preparatory voltage, with respect to all the pixels between the first electrode 14 and the second electrodes 15. The predetermined time is not particularly limited, and may be 0.2 seconds, for example.

In this way, by applying the first voltage (the voltage corresponding to the display gradation 0) to all the pixels, in each pixel of the display gradations 1 to 15, the black particles 132a move to the first electrode 14 side and the white particles 132b move to the second electrodes 15 side in the microcapsules 13.

After applying the first voltage between the first electrode 14 and the second electrodes 15, the controlling section 21 applies the second voltage between the first electrode 14 and the second electrodes 15. Specifically, the controlling section 21 applies the second voltage, as the preparatory voltage, with respect to all the pixels between the first electrode 14 and the second electrodes 15, for a predetermined time. The predetermined time is not particularly limited, and may be 0.2 seconds, for example.

In this way, by applying the second voltage (the voltage corresponding to the display gradation 15), in all the pixels, the black particles 132a move to the second electrodes 15 side and the white particles 132b move to the first electrodes 14 side in the microcapsules 13.

Also in the present embodiment, the controlling section 21 repeatedly performs a set of operations to apply the first voltage and to thereafter apply the second voltage between the first electrode 14 and the second electrodes 15. That is, the controlling section 21 applies the first voltage and the second voltage alternately for a plurality of times (e.g., three times) between the first electrode 14 and the second electrodes 15.

In this way, by applying the first voltage and the second voltage alternately for a plurality of times, in all the pixels, the black particles 132a move between the first electrode 14 and the second electrodes 15 and the white particles 132b move between the first electrodes 14 and the second electrodes 15.

Then, after the preparatory operation in step S6, the control proceeds to step S7.

On the other hand, if the controlling section 21 determines that the temperature is 5 degrees centigrade or higher in step S5, the control proceeds to step S7.

Next, in step S7, the controlling section 21 performs a rewriting operation based on the image data. Specifically, the controlling section 21 applies a rewriting voltage between the first electrode 14 and the second electrodes 15. During this operation, the controlling section 21 applies, to each pixel, a voltage corresponding to a display gradation of that pixel in the display image after rewriting. Then, the controlling section 21 applies the rewriting voltage for a predetermined time (e.g., 0.2 seconds, 6 times), and stops the voltage application. Note that, in the electronic paper 100, the display image is retained on the display panel 10, even after the voltage application stops.

In the above manner, the rewriting of the display image on the electronic paper 100 ends.

As described so far with reference to FIG. 1 to FIG. 4, in the present embodiment, when the detection result of the temperature sensor 2 falls within a predetermined temperature range (−3 degrees centigrade or higher and lower than 5 degrees centigrade in this example), the controlling section 21 performs a preparatory operation to apply a preparatory voltage to the color particles 132, and then performs the rewriting operation. Accordingly, even under an environment in which the temperature during usage is low and appropriate rewriting of a display image is not expected, if a rewriting operation is performed after performing a preparatory operation, such situation in which appropriate rewriting of a display image is not performed is less likely to happen. In other words, the temperature range in which the electronic paper 100 is usable can be widened.

Note that when the temperature during usage is low, not only viscosity of the dispersion liquid 133 increases, but also in some areas, viscosity of the dispersion liquid 133 could further increase locally, which can prevent appropriate rewriting of a display image. On the other hand, in the present embodiment, a preparatory voltage is applied to the color particles 132, to forcibly move the color particles 132 within the dispersion liquid 133. As a result, the viscosity of the dispersion liquid 133 becomes even, and local increase in viscosity is restrained. Furthermore, as the color particles 132 move within the dispersion liquid 133, friction arises between the color particles 132 and the dispersion liquid 133, which increases the temperature of the dispersion liquid 133 and the color particles 132. Accordingly, movement of the color particles 132 in the dispersion liquid 133 is made easier, which facilitates appropriate rewriting of the display image.

In addition, as described above, when a rewriting operation is performed when the detection result of the temperature sensor 2 is out of the predetermined temperature range (when the temperature is 5 degrees centigrade or higher and lower than 53 degrees centigrade, in this example), the controlling section 21 performs a rewriting operation without performing a preparatory operation. Therefore, the display image can be rewritten faster than in a case where the preparatory operation is performed.

In addition, as described above, the predetermined temperature range is lower than 5 degrees centigrade (first temperature). If the predetermined temperature range is lower than 5 degrees centigrade (first temperature), the viscosity of the dispersion liquid 133 increases, and appropriate rewriting of the display image is less likely to be expected. The present disclosure is particularly effective for such cases.

In addition, as described above, the predetermined temperature range is in the range of lower than 5 degrees centigrade (first temperature) and −3 degrees centigrade (second temperature) or higher. If the predetermined temperature range is −3 degrees centigrade (second temperature) or higher, the preparatory operation facilitates appropriate rewriting of the display image. Therefore, the present disclosure is particularly effective for such case.

In addition, as described above, the controlling section 21 performs a preparatory operation and then a rewriting operation, when the detection result of the temperature sensor 2 falls within the predetermined temperature range after being a temperature lower than the predetermined temperature range. Specifically, in the flow illustrated in FIG. 4, after the control returns from step S4 to step S2, if the control proceeds to steps S3, S4, S5, and to S6, a rewriting operation is performed in step S7. Therefore, the display image can be rewritten when the ambient temperature reaches the second temperature or higher.

In addition, as described above, when performing a rewriting operation, the controlling section 21 applies the voltage corresponding to the display gradation of the display image, between the first electrode 14 and the second electrodes 15. On the other hand, while performing a preparatory operation, the controlling section 21 applies the first voltage, as a preparatory voltage, between the first electrode 14 and the second electrodes 15. Therefore, unlike the rewriting operation, the preparatory operation can apply a same voltage across all the pixels, for example. Therefore, the preparatory operation can be performed easily.

In addition, as described above, the absolute value of the first voltage is equal to or greater than the absolute value (e.g., 5V) of the maximum voltage (e.g., −5V) of the voltage corresponding to the display gradation of the display image, whose polarity is on the same side (e.g., the negative side) as that of the first voltage. Accordingly, of the rewriting voltage, a voltage equal to or greater than the absolute value of the maximum voltage can be applied as the preparatory voltage. As a result, the color particles 132 can be forcibly moved within the dispersion liquid 133.

In addition, as described above, during the preparatory operation, the controlling section 21 applies the first voltage and then the second voltage, as the preparatory voltage, between the first electrode 14 and the second electrodes 15. That is, for example, during the preparatory operation, the first voltage is applied to move the black particles 132a to the first electrode 14 side, and the white particles 132b to the second electrodes 15 side, and then the second voltage is applied to move the black particles 132a to the second electrodes 15 side, and the white particles 132b to the first electrode 14 side. Therefore, before performing the preparatory operation, the black particles 132a and the white particles 132b can be forcibly moved within the dispersion liquid 133, with respect to both of the pixels having been rendered in black and the pixels having been rendered in white.

In addition, as described above, the second voltage is a voltage whose polarity is reverse to the first voltage. Accordingly, during the preparatory operation, the black particles 132a and the white particles 132b can be easily moved to the first electrode 14 side or to the second electrodes 15 side.

In addition, as described above, the absolute value of the second voltage is equal to or greater than the absolute value (e.g., 5V) of the maximum voltage (e.g., +5V) of the voltage corresponding to the display gradation of the display image, whose polarity is on the same side (e.g., the positive side) as that of the second voltage. Accordingly, of the rewriting voltage, a voltage equal to or greater than the absolute value of the maximum voltage can be applied as the preparatory voltage. As a result, the color particles 132 can be forcibly moved within the dispersion liquid 133.

In addition, as described above, during the preparatory operation, the controlling section 21 repeatedly performs a set of operations to apply the first voltage and then the second voltage, as the preparatory voltage, between the first electrode 14 and the second electrodes 15. As a result, the viscosity of the dispersion liquid 133 becomes move even, and local increase in viscosity is further restrained. Moreover, due to the movement of the color particles 132 within the dispersion liquid 133, further friction arises between the color particles 132 and the dispersion liquid 133, which further increases the temperature of the dispersion liquid 133 and the color particles 132. Accordingly, movement of the color particles 132 in the dispersion liquid 133 is made further easier, which further facilitates appropriate rewriting of the display image.

So far, an embodiment of the present disclosure has been described with reference to the drawings. However, the present disclosure is not limited to the above-described embodiment, and can be implemented in various manners without departing from the spirits thereof. In addition, various types of disclosure are possible by appropriately combining a plurality of constituting elements disclosed in the above-described embodiment. For example, some of all the constituting elements disclosed in the embodiment can be omitted. Alternatively, some constituting elements can be combined across embodiments, where necessary. To facilitate understanding, each constituting element is mainly drawn schematically in the drawings, and thus the thickness, the length, the number, the interval, etc. of each constituting element in the drawings may be different from the actual ones, for the convenience of rendering the drawings. It is also to be noted that the material, the form, the size, etc. of each constituting element in the above-described embodiment are exemplary, and are not particularly limited, and various changes can be made within the scope not substantially departing from the effects of the present disclosure.

For example, in the above-described embodiment, the present disclosure is applied to electronic paper 100 in a microcapsule method having microcapsules 13. However, the present disclosure is not limited to this. For example, the present disclosure may be applied to electronic paper in such a method having color particles 132 but not microcapsules 13. The present disclosure may also be applied to electronic paper in a twist ball method which rewrites a display image by rotating color particles whose hemispherical surfaces are rendered in two colors.

In addition, in the present embodiment described above, the predetermined temperature range is −3 degrees centigrade or higher and lower than 5 degrees centigrade, for example. However, the present disclosure is not limited to this, and the threshold values for the predetermined temperature range may be a temperature other than −3 degrees centigrade, and a temperature other than 5 degrees centigrade. The threshold values for the predetermined temperature range can differ according to the physical property values of the color particles 132 of the microcapsules 13, the physical property values of the dispersion liquid 133, and the like, for example.

In addition, in the present embodiment described above, the rewriting operation is not performed if the detection result is lower than −3 degrees centigrade, or 53 degrees centigrade or higher. However, the present disclosure is not limited to this. For example, the rewriting operation of the display image may be performed even if the detection result is lower than −3 degrees centigrade, or 53 degrees centigrade or higher. That is, rewriting may be performed even if the detection result is lower than −3 degrees centigrade, or 53 degrees centigrade or higher, taking into consideration the possibility that the image will not be appropriately displayed.

In addition, in the present embodiment described above, when performing the preparatory operation, the voltage corresponding to a display gradation 0 or the voltage corresponding to a display gradation 15, in the dynamic range of 16 white and black gradations, is applied, for example. However, the present disclosure is not limited to this. For example, when performing the preparatory operation, the voltage corresponding to the display gradation 1 or 2 or the voltage corresponding to the display gradation 13 or 14, in the dynamic range of 16 white and black gradations, may be applied.

In addition, in the present embodiment described above, when performing the preparatory operation, a same voltage is applied to all the pixels. However, the present disclosure is not limited to this. For example, when performing the preparatory operation, the first voltage may be applied to a part of the pixels, and the second voltage may be applied to the rest of the pixels. Thereafter, the second voltage may be applied to the part of the pixels, and the first voltage may be applied to the rest of the pixels.

In addition, in the present embodiment described above, the image data is obtained in step S1. However, the present disclosure is not limited to this. For example, the image data may be obtained immediately before step S7 (rewriting operation).

In addition, in the present embodiment described above, the determination in steps S3-S5 is performed based on the ambient temperature of the electronic paper 100. However, the present disclosure is not limited to this. Determination in steps S3 to S5 may be performed based on the internal temperature of the electronic paper 100.

In addition, the present embodiment described above recites that the controlling section 21 may perform error notification in step S3 and step S4, in which case, the processing continues by returning to step S2. However, the present disclosure is not limited to this. For example, in step S3 or step S4, when performing error notification, the controlling section 21 may end the processing without performing a rewriting operation.

The invention claimed is:

1. Electronic paper comprising:
a display panel containing color particles which move when a voltage is applied;
a temperature sensor that detects a temperature; and
a controlling section that controls a rewriting operation to rewrite an image displayed on the display panel by applying a rewriting voltage to the color particles, wherein:
in a case that a result of a detection by the temperature sensor falls within a predetermined temperature range, the controlling section performs the rewriting operation after performing a preparatory operation that applies a preparatory voltage to the color particles,
the predetermined temperature range is lower than a first temperature and equal to, or higher than, a second temperature,
in a case that the result of the detection by the temperature sensor is higher than the predetermined temperature range and lower than a third temperature, the controlling section performs the rewriting operation without performing the preparatory operation, and
in a case that the result of the detection by the temperature sensor is equal to, or higher than, the third temperature, the controlling section issues an error notification without performing the rewriting operation.

2. The electronic paper according to claim 1, wherein in a case that the result of the detection by the temperature sensor is lower than the predetermined temperature range, the controlling section does not perform the rewriting operation.

3. The electronic paper according to claim 2, wherein in a case that the result of the detection by the temperature sensor falls within the predetermined temperature range after a previous result of detection by the temperature sensor is lower than the predetermined temperature range, the controlling section performs the rewriting operation after performing the preparatory operation.

4. The electronic paper according to claim 1, wherein the display panel includes a first electrode and second electrodes disposed opposite each other, with the color particles therebetween, and the controlling section:

obtains image data related to a display image to be displayed on the display panel;

when performing the rewriting operation based on the image data, applies, between the first electrode and the second electrodes, a voltage corresponding to a display gradation of the display image; and when performing the preparatory operation, applies, between the first electrode and the second electrodes, a first voltage as the preparatory voltage.

5. The electronic paper according to claim 4, wherein an absolute value of the first voltage is equal to, or greater than, an absolute value of a maximum voltage of the voltage corresponding to the display gradation of the display image, a polarity of which is on a same side as a polarity of the first voltage.

6. The electronic paper according to claim 4, wherein when performing the preparatory operation, the controlling section applies, as the preparatory voltage, the first voltage and then a second voltage between the first electrode and the second electrodes.

7. The electronic paper according to claim 6, wherein the second voltage is a voltage a polarity of which is reverse to a polarity of the first voltage.

8. The electronic paper according to claim 6, wherein an absolute value of the second voltage is equal to, or greater than, an absolute value of a maximum voltage of the voltage corresponding to the display gradation of the display image, a polarity of which is on a same side as a polarity of the second voltage.

9. The electronic paper according to claim 6, wherein when performing the preparatory operation, the controlling section repeatedly performs a set of operations to apply the first voltage and then the second voltage, as the preparatory voltage, between the first electrode and the second electrodes.

10. A control method performed by electronic paper, the electronic paper including a display panel containing color particles which move when a voltage is applied, the control method comprising:

detecting a temperature;

determining whether the detected temperature falls within a predetermined temperature range, wherein the predetermined temperature range is lower than a first temperature and equal to or higher than a second temperature;

performing a preparatory operation that applies a preparatory voltage to the color particles in a case that the detected temperature falls within the predetermined temperature range;

rewriting an image displayed on the display panel by applying a rewriting voltage to the color particles after performing the preparatory operation;

rewriting the image displayed on the display panel without performing the preparatory operation in a case that the detected temperature is higher than the predetermined temperature range and lower than a third temperature; and issuing an error notification without performing the rewriting operation in a case that the detected temperature is equal to, or higher than, the third temperature.

* * * * *